United States Patent [19]
Grube

[11] Patent Number: 5,123,110
[45] Date of Patent: Jun. 16, 1992

[54] CHANNEL ASSIGNMENT METHOD FOR MULTI-SITE TRUNKED RADIO SYSTEM

[75] Inventor: Gary W. Grube, Palatine, Ill.

[73] Assignee: Motorola, Inc., Schaumburg, Ill.

[21] Appl. No.: 454,496

[22] Filed: Dec. 21, 1989

[51] Int. Cl.$^5$ .............................................. H04Q 7/02
[52] U.S. Cl. .................................. 455/33.1; 455/34.1; 455/54.1; 379/59
[58] Field of Search ....................... 455/33, 35, 54, 56, 455/52, 67, 5, 78; 379/9, 62, 63

[56] References Cited

U.S. PATENT DOCUMENTS

| | | | |
|---|---|---|---|
| 4,317,218 | 2/1982 | Peny | 455/10 |
| 4,347,625 | 8/1982 | Williams | 455/78 |
| 4,553,263 | 11/1985 | Smith et al. | 455/78 |

Primary Examiner—Reinhard J. Eisenzopf
Assistant Examiner—Lisa D. Charouel
Attorney, Agent, or Firm—John W. Hayes

[57] ABSTRACT

A method for allocating communication resources within a communication system wherein communication resources are assigned only within critical sites and within non-critical sites containing critical users. A central controller checks the critical site list for allocating communication resources within the critical sites. No communication resources are allocated within non-critical sites that contain no critical users.

3 Claims, 2 Drawing Sheets

CHANNEL ASSIGNMENT METHOD FOR MULTI-SITE TRUNKED RADIO SYSTEM

TECHNICAL FIELD

This invention relates generally to communication systems and in particular to multi-site trunked communication systems, and is more particularly directed toward a method for allocating communication resources within a multi-site trunked communication system.

BACKGROUND OF THE INVENTION

There are methods well-known in the art for providing RF communication services among groups of users. One such familiar method is the conventional simulcast system. A conventional simulcast system usually comprises several communication sites, each of which has the capability to cover a fairly wide area. Each of these sites contains one or more repeater stations. A repeater station is a type of fixed communication unit that is designed to receive signals on one frequency and retransmit the same signals on another frequency, generally at a higher power. This concept is particularly useful in improving system coverage when it is desired to communicate with a relatively large number of users that may be located in any one of the several sites comprising the simulcast system. All the repeater units are activated simultaneously, on the same frequency, thus broadcasting the desired information over a wide area.

Trunked communication systems can also provide wide area communication service to specific groups of users. Since trunked communications employ both user IDs (identifications) and group IDs, messages intended for single users or groups of users can be transmitted over a multi-site trunked system with relative ease.

One problem shared by both trunked systems and conventional simulcast systems is efficient allocation of RF frequencies, or communication resources, to communication units within their respective systems. In conventional simulcast, since a repeater station within each site is activated for a specific group call transmission, that frequency cannot be used for any other purpose within any of the sites that have been activated. In present-day trunking systems, even though the frequency used in each site of a multi-site system need not be the same, a repeater station must still be activated in each one of the sites.

Accordingly, a need arises for a method for allocating communication resources within a multi-site trunked radio system that does not needlessly encumber communication resources.

SUMMARY OF THE INVENTION

According to the invention, a method is provided for allocation of communication resources within a communication system. The communication system comprises first and second communication sites and a first group of communication units having a predetermined relationship with the first communication site. At least some of the first group of communication units have a predetermined status. The method comprises the steps of (when a communication is intended for the first group of communication units) allocating communication resources within the first communication site to support the communication, and allocating communication resources to support the communication within the second site when at least one of the first group of communication units having a predetermined status is then being serviced by the second communication site, but not when only communication units not having the predetermined status are then being serviced by the second communication site.

DETAILED DESCRIPTION OF THE INVENTION

Figure 1:
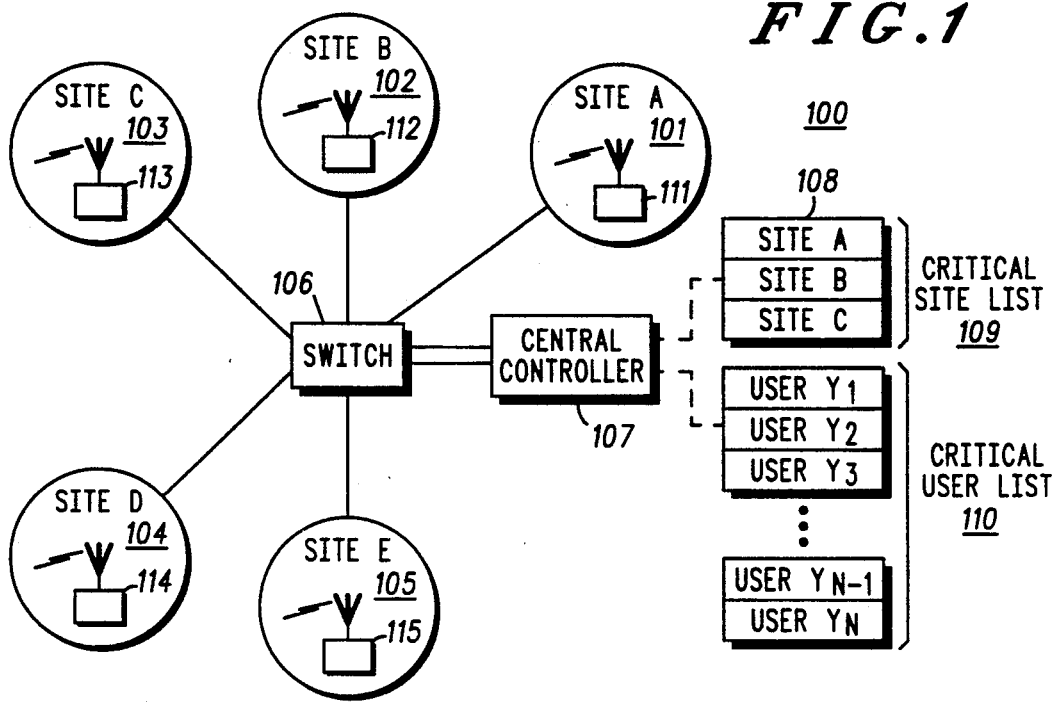
FIG. 1 illustrates a multi-site trunked communication system.

FIG. 1 is a diagram of a multi-site trunked communication system, as generally, depicted by the number 100. The system shown includes five sites designated as site A through site E (101–105). Only five sites are shown for the sake of simplicity, although many more sites could be employed in order to cover a large geographic area. Each site includes one or more trunked base sites (111–115) which gives each site the capability of communicating on a number of communication resources simultaneously. (As used herein, "communication resources" may include frequencies, frequency pairs, TDM time slots, and the like). Each trunked base site is connected to a switch matrix (106) which is under the control of a central processing resource or central controller (107).

Since the infrastructure or backbone of a multi-site trunked communication system already includes numerous processing resources, it is a relatively simple matter for the central controller (107) to maintain a data base that reflects the IDs of communication units located within the several sites. In order to ensure that communication may be carried on in the most efficient manner among communication units within a particular group of users, the central controller (107) also maintains a data base (108) of critical site and critical user information.

In general, a critical site is one that represents the geographic home base of a given group of communication users. For a group having a large number of users ranging over a large geographic area (for example, a state police agency), there may be more than one critical site to ensure adequate coverage of the geographic area in which this group of users primarily operates. A critical site list (109) is shown as part of the data base (108) of FIG. 1.

A critical user list (109) is also represented in FIG. 1 as a part of the data base (108). Critical users are those users within a particular user group for which communications are essential. In the state police example cited above, the Chief of Police and various commanders would be part of the critical user list.

Figure 2:
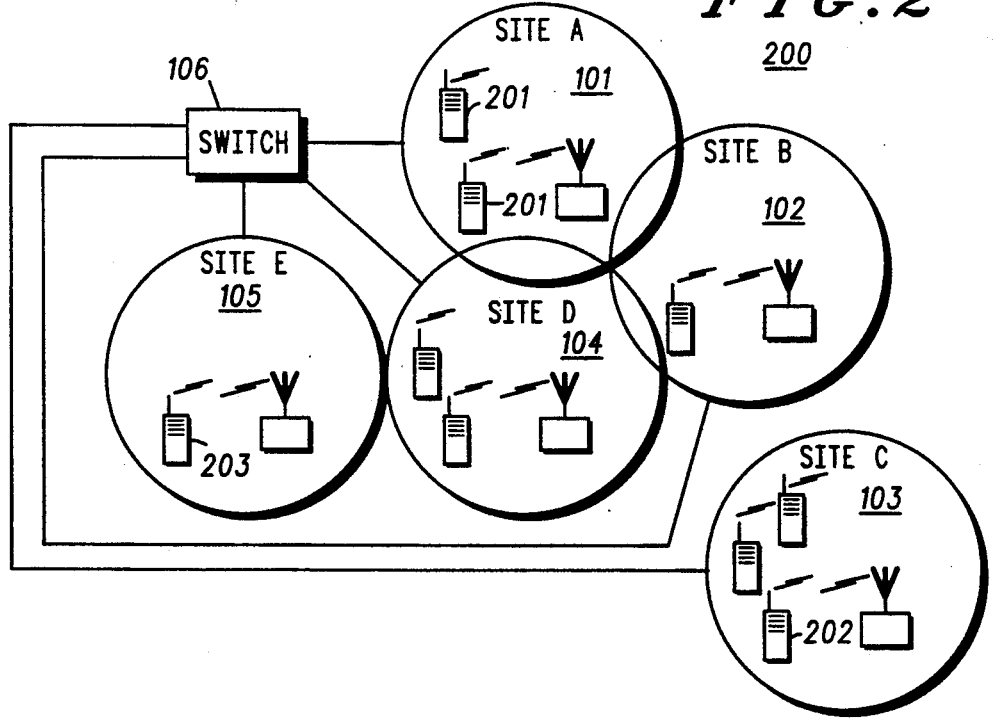
FIG. 2 depicts allocation of communication resources to communication units within the multi-site trunked system using the method of the present invention.

FIG. 2 shows the geographic relationship of the sites represented in FIG. 1. Site A (101), site B (102), and site C (103) are the critical sites listed in the data base (108) of FIG. 1. These sites afford communication coverage over a first coverage area. Sites D and E (104–105) provide coverage for a second coverage area that is not coincident with the first coverage area.

If a message were desired to be transmitted to this group of users, suitable communication resources would be allocated within sites A, B and C (101-103), because these sites have been identified as critical to this group of users. In order to avoid an inefficient allocation of communication resources within other sites of the communication system, which could cause disruption of other communications, the central controller (107) checks the critical user list (110) to determine if any critical users are outside the sites on the critical site list (109). In this example, the group communication is intended for two communication units (201) illustrated within site A (101), another communication unit (202) that is within site C (103), and a forth communication unit (203) that is presently within the coverage area of site E (105). Since the communication unit (203) within site E (105) is the only critical user that is not within a critical site, communication resources within site E are allocated to this group communication. No communication resources need be allocated within site D (104), since it is not on the critical site list, and no critical users are currently within its coverage area. It should be noted that even though users belonging to the group are known to be within the coverage area of site D (104), no communication resources are allocated within site D (104) unless one or more of the users is a critical user.

Figure 3:
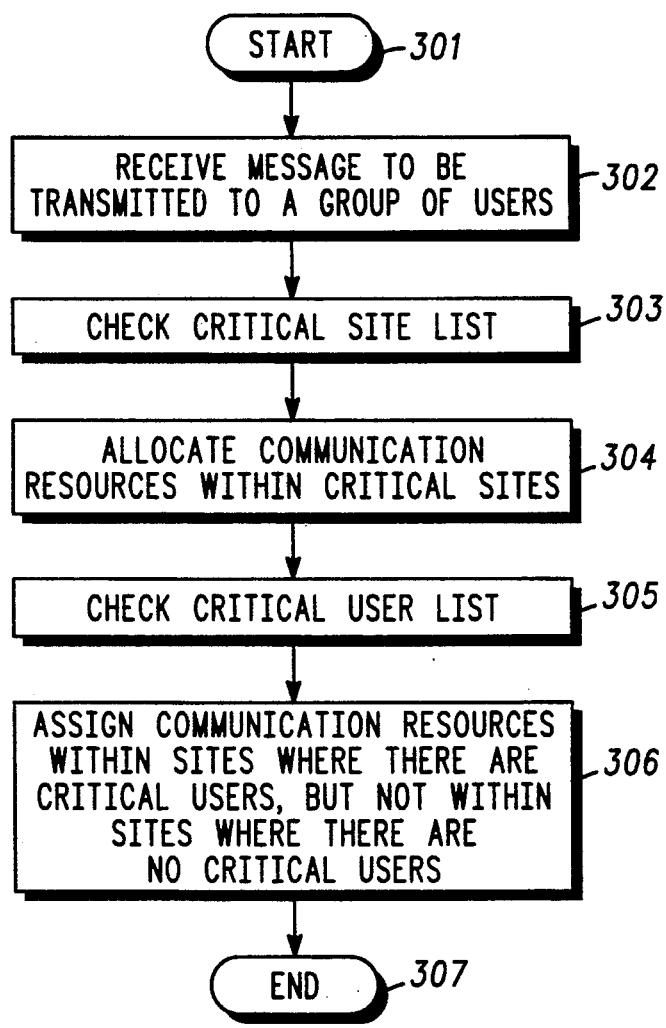
FIG. 3 is a flowchart depicting assignment of communication resources in accordance with the method of the present invention.

The flowchart of FIG. 3 illustrates the steps involved in allocating communication resources in the manner of the present invention. After a message intended for a group of users has been received (block 302), the central controller checks the critical site list in block 303. As discussed previously, allocating communication resources within the critical sites ensures coverage within the geographic area in which the group of users primarily operates. The step of allocating communication resources within the critical sites is shown in block 304.

In the next step (305), the critical user list is examined. One or more of the critical users may currently be outside the coverage area represented by the critical sites, so communication resources must be allocated within the sites in which these critical users are currently operating (block 306). Of course, no communication resources are allocated within non-critical sites that contain no critical users.

What is claimed is:

1. A method for allocating communication resources within a communication system, wherein the communication system includes:

a first communication site having a first coverage area;

a second communication site having a second coverage area, wherein at least a part of the second coverage area is not coincident with the first coverage area; and a first group of communication units having a predetermined relationship with the first communication site, and wherein at least some of the first group of communication units have a predetermined status;

the method comprising the steps of:

when a communication is intended for the first group of communication units:

(a) allocating communication resources within the first communication site to support the communication;

(b) allocating communication resources to support the communication within the second site when at least one of the first group of communication units having the predetermined status is then being serviced by the second communication site, but not when only communication units not having the predetermined status are then being serviced by the second communication site.

2. The method in accordance with claim 1, wherein the predetermined relationship between the first group of communication units and the first communication site comprises:

the first communication site is as critical site for the first group of communication units.

3. The method in accordance with claim 1, wherein the predetermined status of said at least some of the first group of communication units comprises:

said at least some of the first group of communication units are critical users.

* * * * *